United States Patent
Otanez et al.

(10) Patent No.: US 9,506,518 B2
(45) Date of Patent: Nov. 29, 2016

(54) CENTRIFUGAL PENDULUM VIBRATION ABSORBER

(71) Applicant: GM Global Technology Operations LLC, Detroit, MI (US)

(72) Inventors: Paul G. Otanez, Troy, MI (US); Randy L. Melanson, Pinckney, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 42 days.

(21) Appl. No.: 14/451,960

(22) Filed: Aug. 5, 2014

(65) Prior Publication Data

US 2016/0040738 A1   Feb. 11, 2016

(51) Int. Cl.
*F16F 7/116* (2006.01)
*F16F 15/14* (2006.01)

(52) U.S. Cl.
CPC .............. *F16F 7/116* (2013.01); *F16F 15/145* (2013.01)

(58) Field of Classification Search
CPC .......... F16H 2045/0263; F16H 45/02; F16H 2045/007; F16H 2045/0226; F16H 2045/0231; F16F 15/145; F16F 15/1313; Y10T 74/2128; Y10T 464/50; Y10T 74/2184
USPC ............. 188/380, 378, 379; 74/574.2, 574.3, 74/574.4; 464/68.2; 192/30 V, 3.28, 3.29, 192/213.1
See application file for complete search history.

(56) References Cited

U.S. PATENT DOCUMENTS

| | | | |
|---|---|---|---|
| 3,296,887 A | 1/1967 | Larsen | |
| 4,070,922 A | 1/1978 | Wyman | |
| 4,995,282 A | 2/1991 | Schumacher | |
| 5,269,197 A | 12/1993 | Yang | |
| 5,495,924 A | 3/1996 | Shaw et al. | |
| 5,666,862 A | 9/1997 | Eckel et al. | |
| 6,394,908 B1 | 5/2002 | Lambert et al. | |
| 8,161,739 B2 | 4/2012 | Degler et al. | |
| 8,161,740 B2* | 4/2012 | Krause | F16F 15/145 192/30 V |
| 8,342,306 B2* | 1/2013 | Werner | F16F 15/12353 192/213.1 |
| 8,403,762 B2* | 3/2013 | Steinberger | F16F 15/13492 192/3.29 |
| 8,424,659 B2 | 4/2013 | Otanez et al. | |
| 8,435,123 B2* | 5/2013 | Bai | F16D 3/12 464/68.2 |
| 8,561,499 B1* | 10/2013 | Schiemann | F16F 15/30 188/378 |

(Continued)

FOREIGN PATENT DOCUMENTS

DE   102008057648 A1   6/2009

*Primary Examiner* — Thomas J Williams
*Assistant Examiner* — Mariano Sy

(57) ABSTRACT

A centrifugal pendulum vibration absorber (CPVA) absorbs vibration and transmits a torque between an output of an engine and an input of a transmission of a vehicle. The CPVA includes a plate with at least one retaining member and a first set of vibration absorbers with at least one mass supported by the at least one retaining member. The at least one mass has a predefined movement path with respect to the plate. The CPVA further includes a first torsion vibration damper assembly that connects the CPVA to a turbine of a torque converter that is selectively engaged with engine, and a second torsion vibration damper assembly that connects the CPVA to the transmission. The at least one mass absorbs a vibration of a harmonic order generated by the engine.

17 Claims, 5 Drawing Sheets

(56) References Cited

U.S. PATENT DOCUMENTS

Figure 1A:
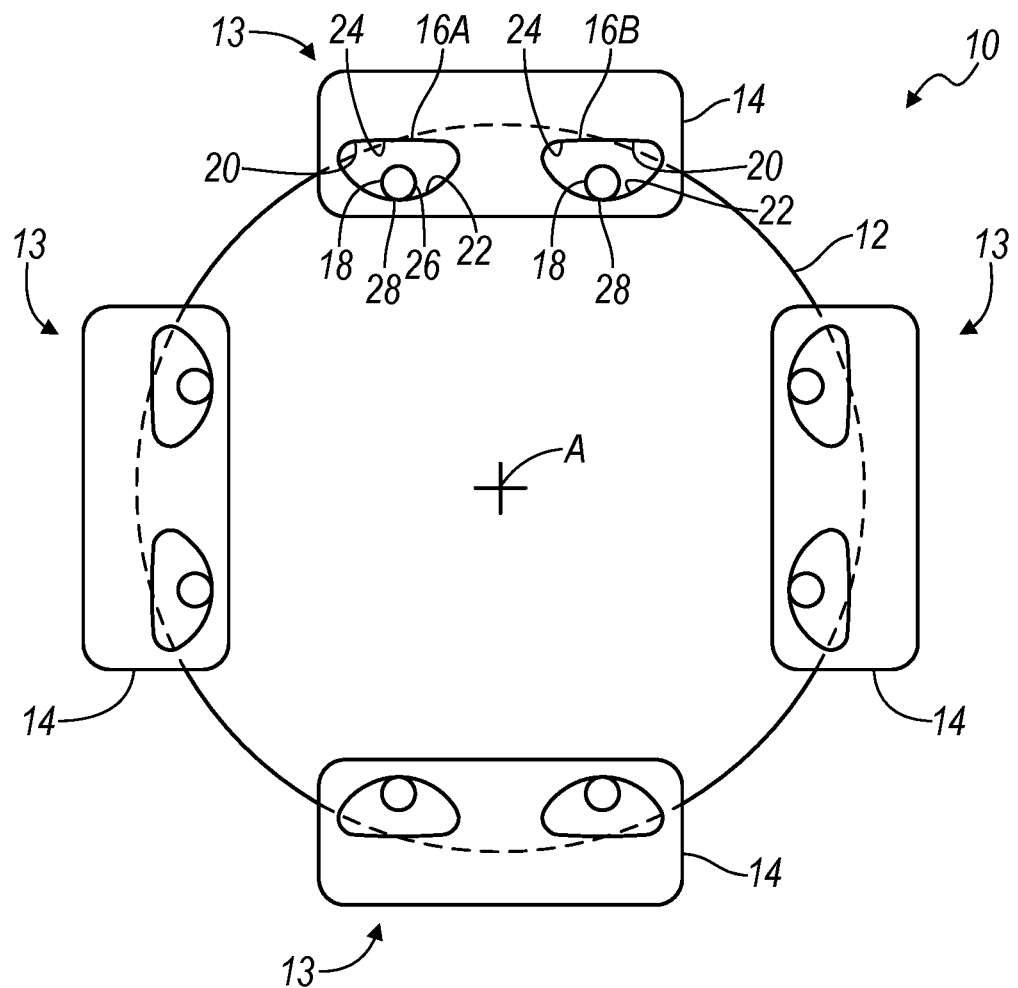

| | | | |
|---|---|---|---|
| 8,807,310 B2* | 8/2014 | Takikawa | F16H 45/02 192/213.1 |
| 8,839,924 B2* | 9/2014 | Takikawa | F16H 45/02 192/213.2 |
| 8,910,762 B2* | 12/2014 | Takikawa | F16F 15/145 188/378 |
| 8,931,607 B2* | 1/2015 | Bai | F16F 15/145 188/378 |
| 9,133,907 B2* | 9/2015 | Takikawa | F16F 15/173 |
| 2009/0125202 A1* | 5/2009 | Swank | F16F 15/12353 701/68 |
| 2009/0211871 A1 | 8/2009 | Hartmann et al. | |
| 2010/0269497 A1* | 10/2010 | Engelmann | F16F 15/145 60/338 |
| 2011/0180358 A1 | 7/2011 | Otanez et al. | |
| 2011/0186395 A1 | 8/2011 | Bai | |
| 2011/0195794 A1 | 8/2011 | Bai et al. | |
| 2012/0080281 A1* | 4/2012 | Takikawa | F16H 45/02 192/3.28 |
| 2013/0228041 A1 | 9/2013 | Otanez et al. | |
| 2013/0237329 A1 | 9/2013 | Bai et al. | |

* cited by examiner

US 9,506,518 B2

1

CENTRIFUGAL PENDULUM VIBRATION ABSORBER

FIELD

The present disclosure relates to a system for absorbing torsional vibration created by operation of an engine, and in particular to a system including a high performance centrifugal pendulum vibration absorber configured to absorb torsional vibrations created during engine operation.

BACKGROUND

The statements in this section merely provide background information related to the present disclosure and may or may not constitute prior art.

Centrifugal Pendulum Vibration Absorbers (CPVAs) are typically used to reduce torsional vibrations in rotating machine components. For example, a rotating member such as a shaft includes several CPVAs, where each CPVA has a pendulum mass that oscillates as the shaft rotates. The movement of the pendulum masses counteract torque fluctuations that are transmitted from the engine to the shaft as the shaft rotates, which reduces the torsional vibration of the shaft. CPVAs can be designed such that the oscillation frequency of the pendulum mass matches the engine combustion frequency at any engine operating speed. However, matching the oscillation frequency with the engine combustion frequency does not always provide suitable vibration reduction in automotive vehicles. This is because frequency characteristics of automotive engines in motor vehicles are influenced by axle stiffness and transmission inertias as well as engine RPM.

As a result, spring dampers are sometimes used instead of CPVAs to attenuate torsional vibrations transmitted by automobile engines. One drawback, however, is that spring dampers are generally only effective within a predetermined frequency range that is often narrow. The design tradeoff of having to tune the spring dampers for a specific frequency range results in that they are generally not able to provide sufficient dampening at certain engine speeds.

While current CPVAs and spring dampers achieve their intended purpose, there is a need for a new and improved vibration dampening system which exhibits improved performance from the standpoint of dampening torsional vibrations at a variety of engine speeds.

SUMMARY

A centrifugal pendulum vibration absorber (CPVA) absorbs vibration and transmits a torque between an output of an engine and an input of a transmission of a vehicle. The CPVA includes a plate with at least one retaining member and a first set of vibration absorbers with at least one mass supported by the at least one retaining member. The at least one mass has a predefined movement path with respect to the plate. The CPVA further includes a first torsion vibration damper assembly that connects the CPVA to a turbine of a torque converter that is selectively engaged with the engine, and a second torsion vibration damper assembly that connects the CPVA to the transmission. The at least one mass absorbs a vibration of a harmonic order generated by the engine.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

Figure 1B:
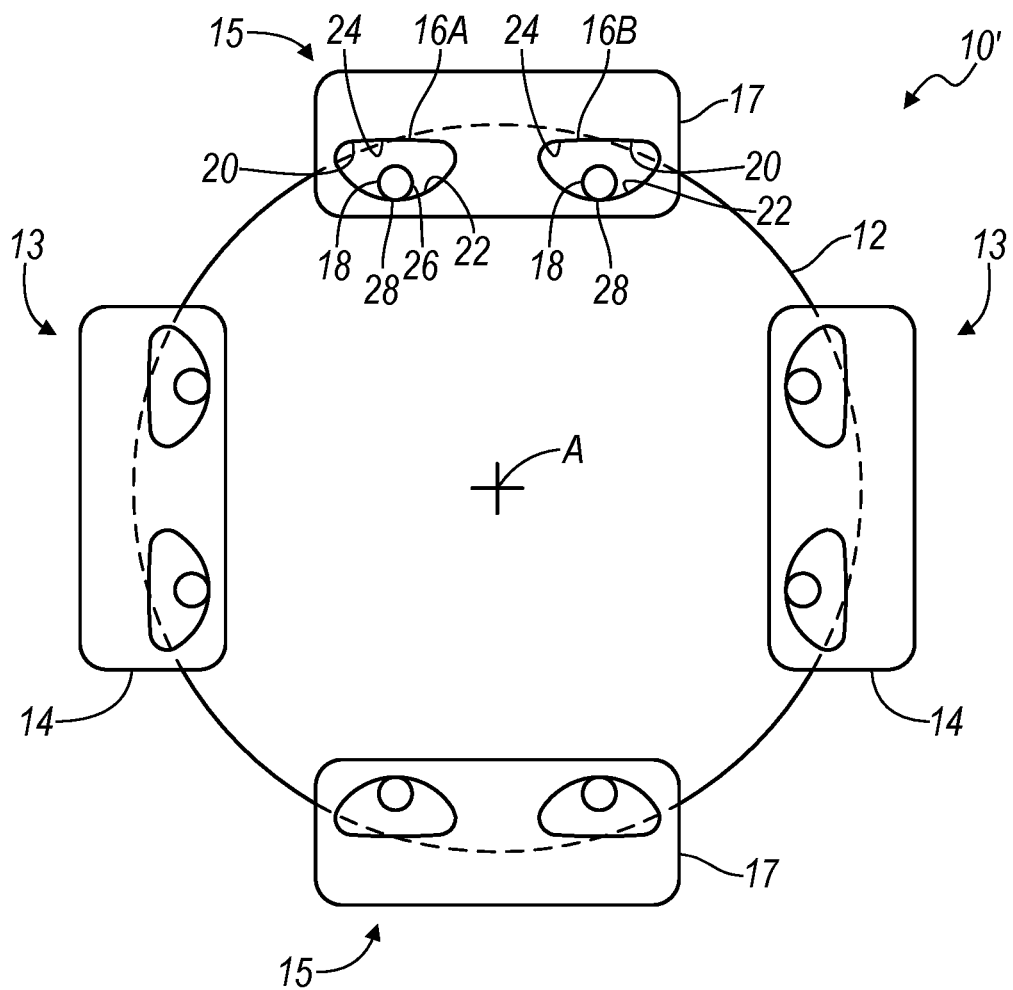
Figure 2:
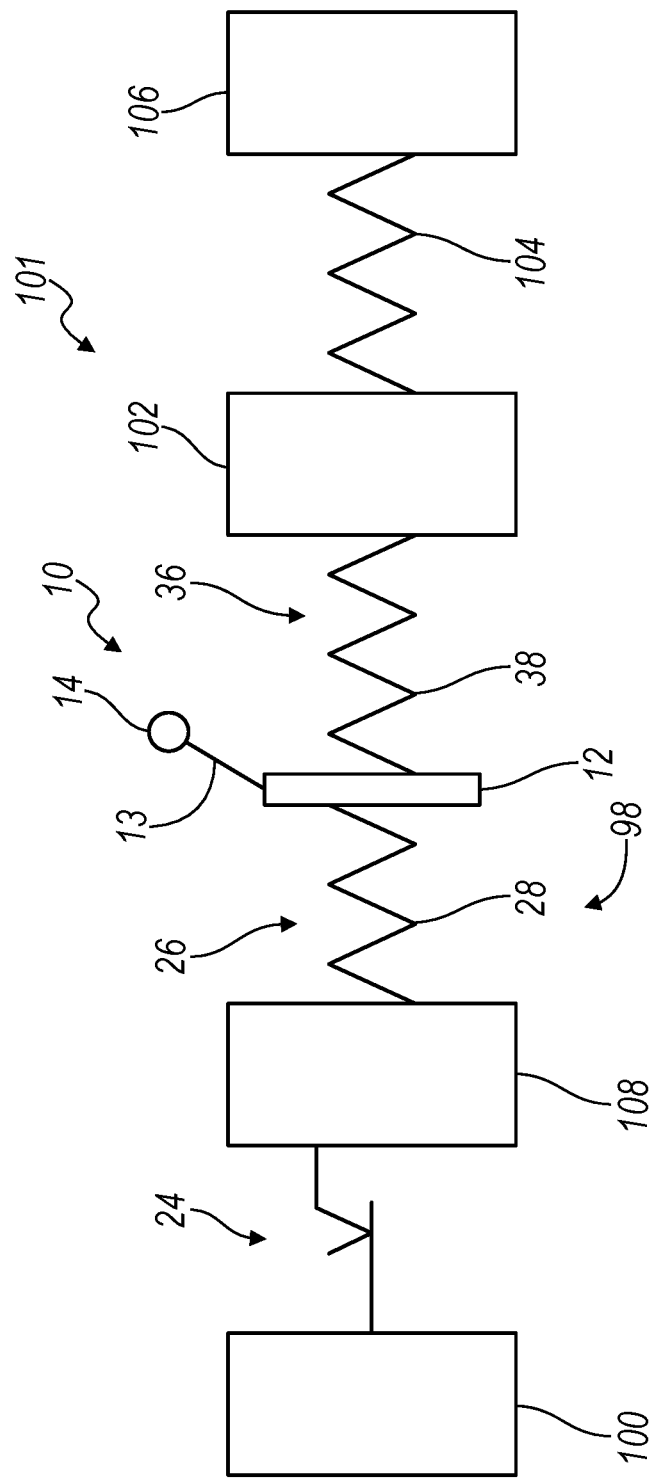
Figure 3:
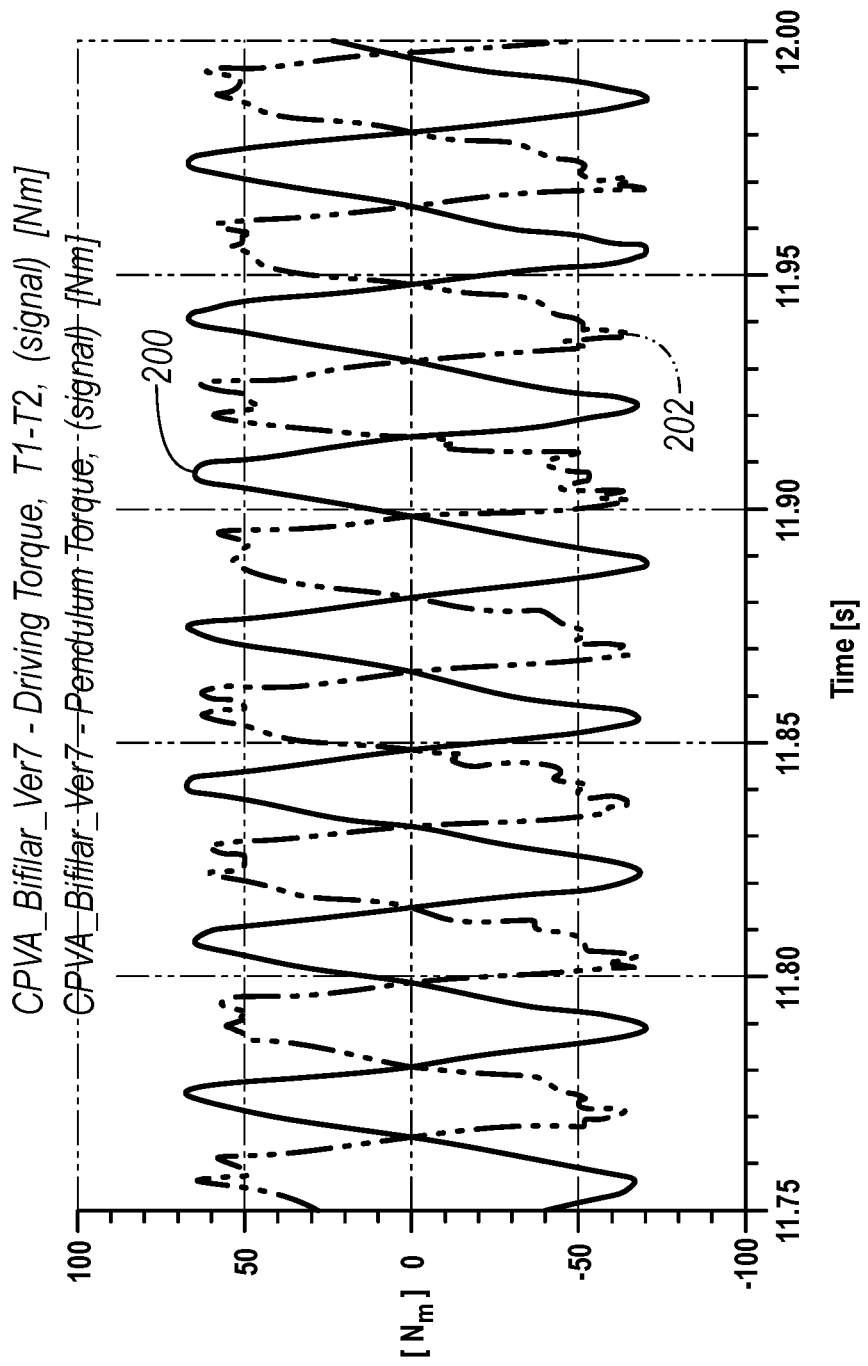
Figure 4:
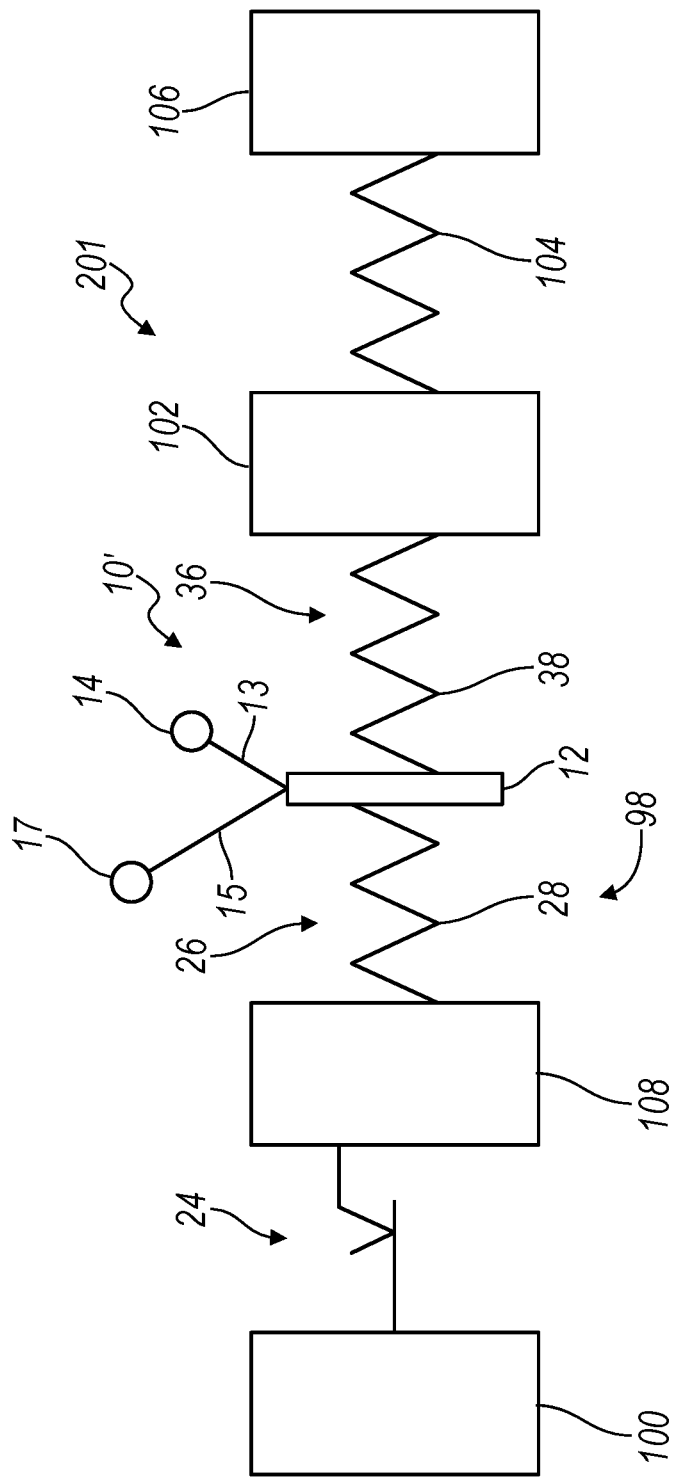

FIG. 1A is a schematic view of a CPVA;
FIG. 1B is a schematic view of an alternative CPVA;
FIG. 2 is a schematic illustration of a vibration absorber system with the CPVA illustrated in FIG. 1A in accordance with the principles of the present invention;
FIG. 3 shows a graph of the performance characteristics of the vibration absorber system of FIG. 2; and
FIG. 4 is a schematic illustration of an alternative vibration absorber system with the CPVA illustrated in FIG. 1B in accordance with the principles of the present invention.

DETAILED DESCRIPTION

The following description is merely exemplary in nature and is not intended to limit the present disclosure, application, or uses. With reference to FIG. 1, a centrifugal pendulum vibration absorber (CPVA) system is generally indicated by reference number 10. The CPVA system 10 includes a rotating plate 12 and a set of vibration absorbers 13 with a plurality of pendulum masses that are moveably connected with the first plate 12. The plate 12 is driven by a torque producing machine to provide a driving torque to the plate 12. Accordingly, the plate 12 is rotatable about an axis "A" concentric with the plate 12. The plate 12 is operable to transmit torque to another component within the motor vehicle, such as a transmission component. For example, the plate 12 may be connected to another rotatable plate or member (not shown) that is preferably part of a torque transmitting device such as, for example, a torque converter of an automatic transmission or a clutch of a manual transmission. However, it should be appreciated that the plate 12 may be connected to various other components within a powertrain drive line without departing from the scope of the present invention.

The pendulum masses 13 are each moveably connected with the first plate 12, where each of the pendulum masses 13 includes two apertures 16A and 16B located within the pendulum masses 13. Corresponding retaining members such as pins 18 connected to the plate 12 are provided for each aperture 16, where each aperture 16 receives one of the pins 18 therethrough. The apertures 16A and 16B are defined by an internal surface 20 of the pendulum mass 13 that includes a first surface or active section 22 and a second surface or passive section 24. The active section 22 defines the path of the pendulum mass 16. The passive section 24 preferably has a straight contour, though other contours may be employed without departing from the scope of the present invention. Each of the plurality of pendulum masses 13 are circumferentially arranged in a substantially symmetrical pattern around the rotational axis "A" of the plate 12. In the present embodiment, four pendulum masses 13 are included with the CPVA 10, however those skilled in the art will appreciate that any number of pendulum masses 13 may be employed.

When the plate 12 is at rest, the pendulum masses 13 each remain generally stationary and do not move substantially. However, each pendulum mass 13 oscillates or travels about the corresponding pins 18 when the plate 12 rotates about the axis "A". For example, as the pendulum mass 13 travels about the corresponding pins 18, a portion of an outer surface 26 of the pins 18 slides along the active section 22 of each aperture 16A and 16B. Accordingly, each pendulum mass 13 travels about a specific path that is determined by the contour of the active section 22 which controls the movement of the pendulum mass 13 about the corresponding pins 18. The movement of the pendulum masses 13 along the paths counteract at least some of the torque fluctuations that are created as the engine operates, which thereby reduces torsional vibration.

Referring now to FIG. 2, there is shown a vibration absorber system 101 with the CPVA 10 in accordance with the principles of the present invention. An engine 100 is connected to a torque transmitting device 23, such as, for example, a clutch. The torque transmitting device 23 is, in turn, connected to a turbine 108 of, for example, a torque converter 98. The torque converter includes a first torsion vibration damper assembly 27 with a biasing member 28, such as, for example, a coil spring. A first end of the first torsion vibration damper assembly 27 is connected to the turbine 108, and a second end of the first torsion vibration damper assembly 27 is connected to the CPVA 10. The set of vibration absorbers 13 are slidingly connected with the first plate 12, where each of the first vibration absorbers 13 includes a selectively moveable pendulum mass 16. A second torsion vibration damper assembly 36 with a biasing member 38, such as, for example, a coil spring, connects the CPVA 10 to a transmission 102. Specifically, a first end of the second torsion vibration assembly 36 is connected to the CPVA 10, and a second end of the second torsion vibration assembly 36 is connected to the transmission 102. The transmission 102 is connected to an axle 104 of a vehicle 106.

In the system 101, each of the masses 13 include generally identical paths, where the masses 13 move generally in unison with one another. The masses 13 travel in synchronicity with one another if the engine produces a torsional vibration that is of a single harmonic order. Performance characteristics of the system 101 are shown in FIG. 3. Specifically, FIG. 3 shows a graph of the pendulum torque (Nm) 200 versus the driving torque (Nm) 202 over time (sec).

Alternatively, CPVAs may be configured to absorb torsional vibrations that have at least two different harmonic orders, such as, for example, a CPVA 10' shown in FIG. 1B. The CPVA 10' includes the rotating plate 12, the first set of vibration absorbers 13 with a plurality of pendulum masses, and a second set of vibration absorbers 15 with a plurality of masses that are moveably connected with the first plate 12. The other components of the CPVA 10' are the same as those of the CPVA 10.

FIG. 4 shows an alternative arrangement of a vibration absorber system 201 with the CPVA 10' (FIG. 1B). The vibration absorber system 201 is similar to the vibration absorber 101 (FIG. 2), except that there are the first set of vibration absorbers 13 and a second set of vibration absorbers 15 that are configured to absorb torsional vibrations that have at least two different harmonic orders. Further details of the above described CPVAs and other CPVA arrangements are described in U.S. Pat. No. 8,435,123 and U.S. patent application Ser. No. 12/964,552, filed on Dec. 9, 2010, the entire contents of both being incorporated herein by reference.

The system 201 can be employed with an engine that may produce torsional vibrations of at least two different harmonics due to the firing sequence of the engine's spark plugs. In another example, the engine produces torsional vibrations that have different harmonics if an engine operates on less than all of the cylinders during an improved fuel efficiency mode of operation. For example, if an six cylinder engine switches to a fuel efficiency mode only a portion of the six cylinders are actively fired to provide engine power. This improved fuel efficiency mode of operation improves the fuel economy of the engine. The engine produces torsional vibrations of a different harmonic content when operating with six cylinders when compared to the torsional vibrations created as the engine operates on, for example, four cylinders.

If the engine produces torsional vibrations of at least two different harmonic orders, the masses 13 travel at a different frequency about the path when compared to the masses 15. That is, the masses 13 do not travel in synchronicity with the masses 15. Instead, the masses 13 travel at a first engine firing frequency about the path to attenuate torsional vibrations created at a first frequency, and the masses 15 travel at a second or other harmonic of the engine firing frequency about the path to attenuate torsional vibrations created at the particular harmonic.

The description of the invention is merely exemplary in nature and variations that do not depart from the gist of the invention are intended to be within the scope of the invention. Such variations are not to be regarded as a departure from the spirit and scope of the invention.

What is claimed is:

1. A centrifugal pendulum vibration absorber (CPVA) for absorbing vibration and transmitting a torque between an output of an engine and an input of a transmission of a vehicle, the CPVA comprising:
   a plate with at least one retaining member;
   a first set of vibration absorbers including at least one mass supported by the at least one retaining member, the at least one mass having a predefined movement path with respect to the plate;
   a first torsion vibration damper assembly that connects the CPVA to a turbine of a torque converter, the turbine being selectively engaged with the engine by a torque transmitting device; and
   a second torsion vibration damper assembly that connects the CPVA to the transmission,
   wherein the first torsion vibration damper assembly, the turbine and the torque transmitting device are arranged in series with the turbine positioned between the torque transmitting device and the first torsion vibration damper assembly, and
   wherein the at least one mass absorbs a vibration of a harmonic order generated by the engine.

2. The CPVA of claim 1 wherein the at least one mass has two apertures and the plate has two retaining members, each aperture having a surface that engages with a respective retaining member.

3. The CPVA of claim 1 wherein the at least one mass are two masses, each mass being supported by two retaining members.

4. The CPVA of claim 3 wherein the at least one mass are four masses, each mass being supported by two retaining members.

5. The CPVA of claim 1 wherein the first torsion vibration damper assembly includes a first biasing member, and the second torsion vibration damper assembly includes a second biasing member.

6. The CPVA of claim 5 wherein the first biasing member and the second biasing member are coil springs.

7. The CPVA of claim 1 further comprising a second set of vibration absorbers including at least one mass that is different than the mass associated with the first set of vibration absorbers.

8. The CPVA of claim 7 wherein the at least one mass of the second set of vibration absorbers absorbs a vibration of another harmonic order generated by the engine that is different than the vibration with the harmonic order absorbed by the at least one mass of the first set of vibration absorbers.

9. The CPVA of claim 8 wherein the at least one mass of the second set of vibration absorbers has two apertures and the plate has two retaining members, each aperture having a surface that engages with a respective retaining member.

10. The CPVA of claim 8 wherein the at least one mass of the second set of vibration absorbers are two masses, each mass being supported by two retaining members.

11. A centrifugal pendulum vibration absorber (CPVA) for absorbing vibration and transmitting a torque between an output of an engine and an input of a transmission of a vehicle, the CPVA comprising:
   a plate with at least two retaining members;
   a first set of vibration absorbers including at least one mass supported by one of at least two retaining members;
   a second set of vibration absorbers including at least one mass supported by another of the at least two retaining members;
   a first torsion vibration damper assembly that connects the CPVA to a turbine of a torque converter by a torque transmitting device, the turbine being selectively engaged with the engine; and
   a second torsion vibration damper assembly that connects the CPVA to the transmission,
   wherein the first torsion vibration damper assembly, the turbine and the torque transmitting device are arranged in series with the turbine positioned between the torque transmitting device and the first torsion vibration damper assembly, and
   wherein the at least one mass of the first set of vibration absorbers absorbs a vibration of a harmonic order generated by the engine, and the at least one mass of the second set of vibration absorbers absorbs a vibration of another harmonic order generated by the engine.

12. The CPVA of claim 11 wherein the at least one mass of the first set of vibration absorbers has two apertures and the plate has two retaining members, each aperture having a surface that engages with a respective retaining member.

13. The CPVA of claim 12 wherein the at least one mass of the second set of vibration absorbers has two apertures and the plate has two additional retaining members, each aperture of the at least one mass of the second set of vibration absorbers having a surface that engages with a respective additional retaining member.

14. The CPVA of claim 11 wherein the at least one mass of the first set of vibration absorbers are two masses, each mass being supported by two retaining members.

15. The CPVA of claim 14 wherein the at least one mass of the second set of vibration absorbers are two masses, each mass being supported by two additional retaining members.

16. The CPVA of claim 11 wherein the first torsion vibration damper assembly includes a first biasing member, and the second torsion vibration damper assembly includes a second biasing member.

17. The CPVA of claim 16 wherein the first biasing member and the second biasing member are coil springs.

* * * * *